US 6,524,161 B1

(12) United States Patent
Asami

(10) Patent No.: US 6,524,161 B1
(45) Date of Patent: Feb. 25, 2003

(54) LUMINOUS TOY

(75) Inventor: Yukihiro Asami, Tokyo (JP)

(73) Assignees: Shine Co., Ltd., Tokyo (JP); Sega Toys, Ltd., Tokyo (JP)

(*) Notice: Subject to any disclaimer, the term of this patent is extended or adjusted under 35 U.S.C. 154(b) by 0 days.

(21) Appl. No.: 09/657,490

(22) Filed: Sep. 8, 2000

(30) Foreign Application Priority Data

Sep. 17, 1999 (JP) .......................................... 11-263832

(51) Int. Cl.⁷ ................................................ A63H 33/26
(52) U.S. Cl. ....................... 446/485; 446/140; 446/279; 446/438; 446/451
(58) Field of Search .............................. 310/319, 328; 446/23, 140, 279, 438, 448, 451, 464, 465, 485

(56) References Cited

U.S. PATENT DOCUMENTS

| | | | | |
|---|---|---|---|---|
| 2,817,926 A | * | 12/1957 | DeCicco | |
| 3,456,134 A | * | 7/1969 | Ko | |
| 3,666,976 A | * | 5/1972 | Gourlay et al. | |
| 4,556,396 A | * | 12/1985 | Kennedy et al. | 446/23 |
| 4,748,366 A | * | 5/1988 | Taylor | 310/328 |
| 4,889,514 A | * | 12/1989 | Auer et al. | 446/485 X |
| 5,138,535 A | * | 8/1992 | Aragon et al. | 446/438 X |
| 5,482,493 A | * | 1/1996 | Rapisarda | 446/438 |

* cited by examiner

Primary Examiner—John A. Ricci
(74) Attorney, Agent, or Firm—Steinberg & Raskin, P.C.

(57) ABSTRACT

A luminous toy capable of emitting light at any time anywhere without having to worry about a power shortage and failing to turn off a switch and capable of preventing environmental pollution. The luminous toy includes a toy body provided with a piezoelectric element which induces a voltage when it is strained, a rectifying circuit for rectifying the voltage generated from the piezoelectric element, a capacitor for smoothing the voltage rectified by the rectifying circuit and a luminous element connected in parallel to the capacitor. The luminous toy also includes a strain generating mechanism for generating strain for straining the piezoelectric element.

9 Claims, 9 Drawing Sheets

LUMINOUS TOY

BACKGROUND OF THE INVENTION

This invention relates to a luminous toy, and more particularly to a luminous toy which is adapted to actuate a strain generating means, to thereby strain or distort a piezoelectric element provided in a toy body, leading to luminescence of a luminous element.

A variety of luminous toys each including a luminous element have been conventionally proposed and put to practical use. The conventional luminous toys each typically include a battery which acts as a power source for feeding electric power to the toy.

Unfortunately, use of a battery as a power source possibly causes a failure in normal operation due to exhaustion of the battery when the toy is repeatedly operated. Also, it is supposed that when the toy is left alone for a long period of time, the battery is unserviceable due to natural discharge thereof. Thus, it is required to always secure a spare battery. Further, even when a secondary battery is used as the power source, it has to be discarded ultimately, leading to an environmental problem such as environmental pollution.

SUMMARY OF THE INVENTION

The present invention has been made in view of the foregoing disadvantage of the prior art.

Accordingly, it is an object of the present invention to provide a luminous toy which is capable of carrying out luminescence anywhere at any time without having to worry about a power shortage of a battery and failing to turn off a switch and the like.

It is another object of the present invention to provide a luminous toy which does not cause any environmental problem such as environmental pollution.

In accordance with the present invention, a luminous toy is provided. The luminous toy includes a toy body provided with a piezoelectric element which induces a voltage when it is strained, a rectifying circuit for rectifying the voltage generated from the piezoelectric element, a capacitor for smoothing the voltage rectified by the rectifying circuit and a luminous element connected in parallel to the capacitor. The luminous toy also includes a strain generating means for generating strain for straining the piezoelectric element.

In a preferred embodiment of the present invention, the strain generating means is selected from a beating mechanism for beating the piezoelectric element and a flip mechanism for flipping the piezoelectric element.

In a preferred embodiment of the present invention, the beating mechanism or flip mechanism may be constructed so as to repeatedly strain the piezoelectric element.

In a preferred embodiment of the present invention, the toy body may be constituted by a target toy and the strain generating means may be constituted by a shooting unit for shooting a projectile at the target toy body.

Alternatively, in a preferred embodiment of the present invention, the toy body may be constituted by a card body including a substrate and the strain generating means may be constituted by the substrate of the card body, wherein the substrate may have the piezoelectric element fixed thereon.

Also, in a preferred embodiment of the present invention, the toy body may be constituted by a spherical body and the strain generating means may be constituted by a weight member, wherein the weight member may be fixed to the piezoelectric element.

Further, in a preferred embodiment of the present invention, the toy body may be constituted by a traveling body including turning wheels and the beating mechanism or flip mechanism may be operated in association with the turning wheels.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
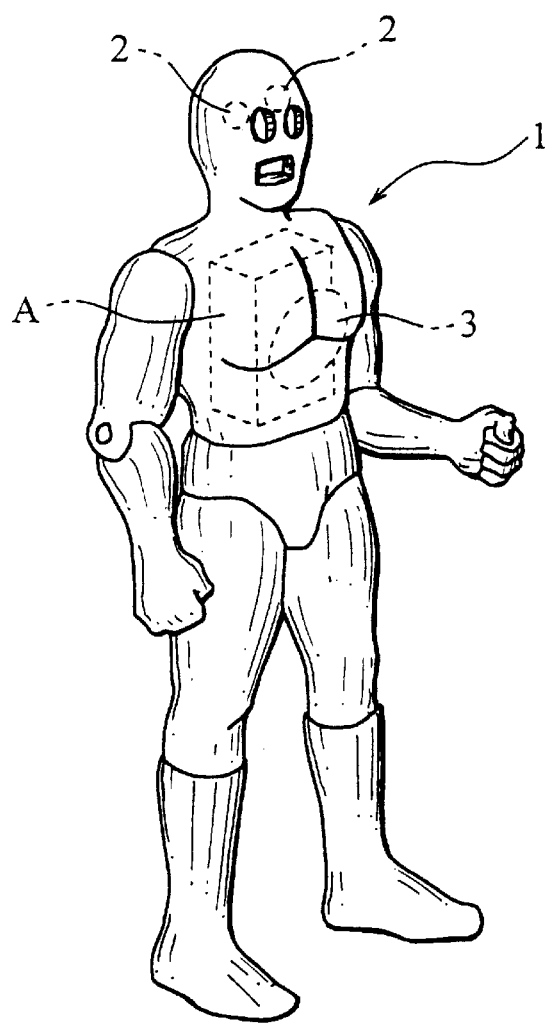
FIG. 1 is a perspective view showing an embodiment of a luminous toy according to the present invention.
Figure 2:
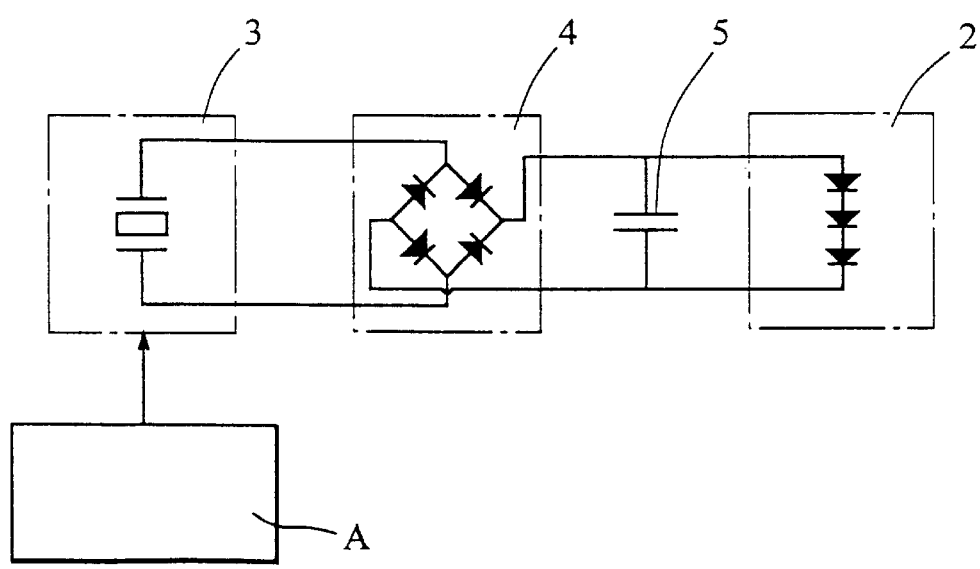
FIG. 2 is a block diagram of the luminous toy shown in FIG. 1.

Now, a luminous toy according to the present invention will be described with reference to the accompanying drawings.

Referring first to FIGS. 1 to 3B, an embodiment of a luminous toy according to the present invention is illustrated. A luminous toy of the illustrated embodiment includes a toy body 1 formed in imitation of a robotic humanoid. The toy body 1 is provided therein with luminous elements 2, a piezoelectric element 3 for generating electric power or a voltage required for luminescence of the luminous element 2, a rectifying circuit 4 for rectifying the voltage generated from the piezoelectric element 3, a smoothing capacitor for smoothing the voltage rectified by the rectifying circuit 4, and a strain generating means A for generating strain for straining the piezoelectric element. The rectifying circuit 4 is preferably constructed so as to carry out full wave rectification.

The luminous elements 2 may each be constituted by a light emitting diode (LED). The LED 2 is embedded in each of eyes of the robotic humanoid, to thereby permit an observer or a user to be impressed as if each of the eyes gleams when it is excited.

The piezoelectric element 3 is comprised of a piezoelectric ceramic material coated on one or both of surfaces of a metal plate serving as an electrode. The metal plate is mounted on the toy body by a suitable fixing means. Each of the thin layers of the piezoelectric ceramic material has a lead attached to an external surface thereof. The metal plate is formed so as to exhibit resiliency or elasticity, to thereby be deformed when stress is applied thereto, resulting in the piezoelectric element being strained. When the metal plate is released from the stress, it is restored to its original state. Thus, the piezoelectric element 3 is strained during both deformation of the metal plate and restoration thereof, to thereby induce a voltage thereacross. For example, the metal plate is formed to have a rectangular shape of 21 mm in length and 17 mm in width and 0.1 mm in thickness, in which both surfaces of the metal plate are coated with the piezoelectric ceramic material to form a circular-shaped thin layer of a 14 mm diameter and a 0.05 mm thickness, respectively. Alternatively, the piezoelectric element 3 may be constituted of a piezoelectric ceramic member and a metal plate fixed on each of both surfaces of the piezoelectric ceramic member so as to act as an electrode.

Figure 3A:
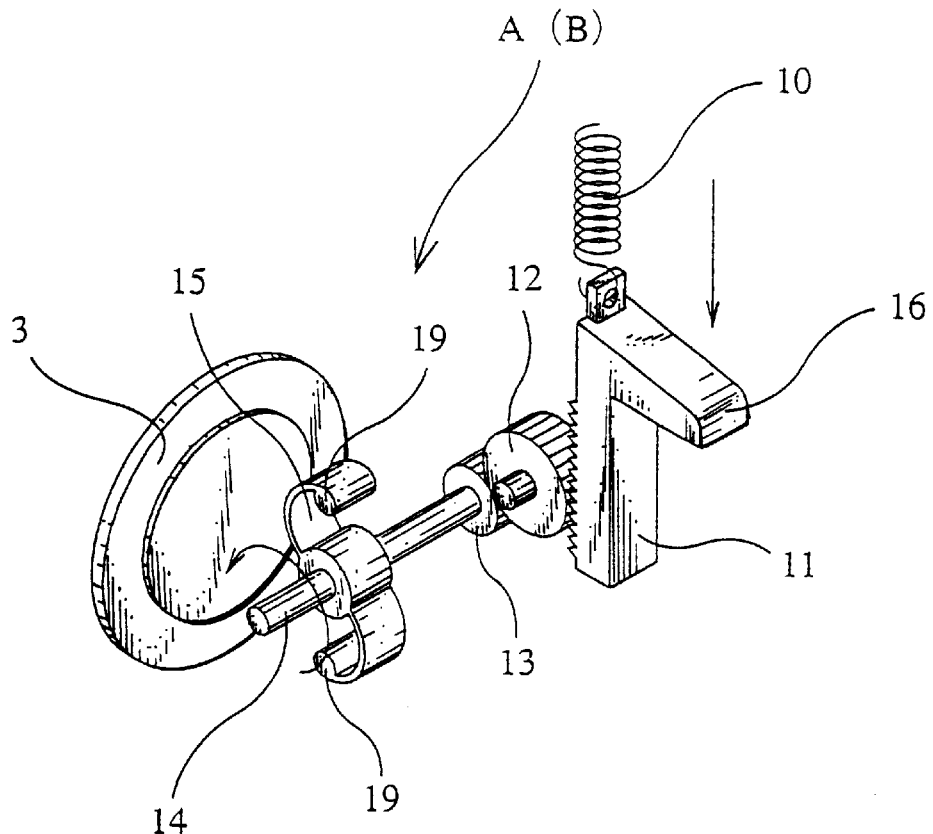
FIGS. 3A and 3B each are a perspective view showing a beating mechanism incorporated in the luminous toy of FIG. 1.
Figure 3B:
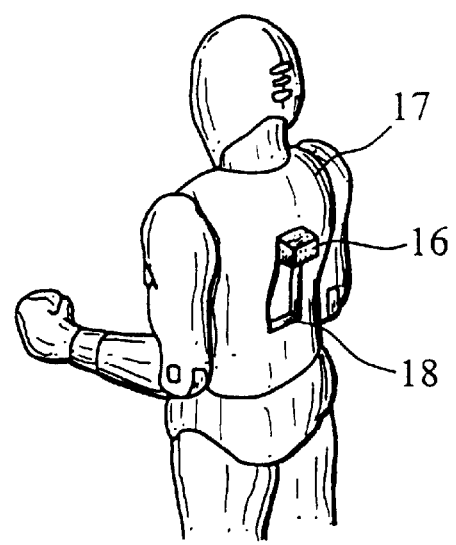

In the illustrated embodiment, the strain generating means A is constituted by a beating mechanism B constructed as shown in FIG. 3A. More particularly, the beating mechanism B constituting the strain generating means A includes a rack gear 11 arranged so as to be vertically movable and constantly urged in an upward direction by a spring 10, a gear 12 engaged with the rack gear 11, and a rotation lever 15 mounted on a revolving shaft 14 which is rotatably supported on a trunk of the toy body 1 and on which a pinion gear 13 engaged with the gear 12 is mounted. The rotation lever 15 is arranged on the revolving shaft 14 so as to extend in a direction perpendicular to the shaft 14. The rotation lever 15 is provided at both distal ends thereof with beating sections 19. The rack gear 11 is provided on a rear surface thereof with an operation rod 16 so as to project outwardly therefrom. The operation shaft 16, as shown in FIG. 3B, has a distal end outwardly projecting through an opening 18 formed at a back of the trunk 17 in a manner to vertically extend, resulting in the rack gear 11 being vertically moved from an outside of the trunk 17. Thus, actuation of the operation rod 16 in the vertical direction permits the rotation lever 15 to be rotated together with the revolving shaft 14, so that the beating sections 19 formed at both ends of the rotation lever 15 may alternately successively beat the piezoelectric element 3.

In the luminous toy constructed as described above, vertical movement of the operation rod 16 leads to vertical movement of the rack gear 11, resulting in the rotation lever 15 being rotated with the revolving shaft 14 through the gear 12. Such rotation of the lever 15 permits the beating sections 19 to alternately repeatedly beat a surface of the piezoelectric element 3. Thus, an AC voltage is induced across the piezoelectric element 3 every time the beating sections 19 beat the surface of the piezoelectric element 3. The AC voltage thus induced is converted into a DC voltage through the rectifying circuit 4 and capacitor 5, to thereby permit luminescence of the LEDs 2. The rotation lever 15 continues to rotate while the rack gear 11 is moved in the vertical direction, so that one-time operation of the operation rod 16 permits the LEDs 2 to repeatedly emit light many times.

Figure 4:
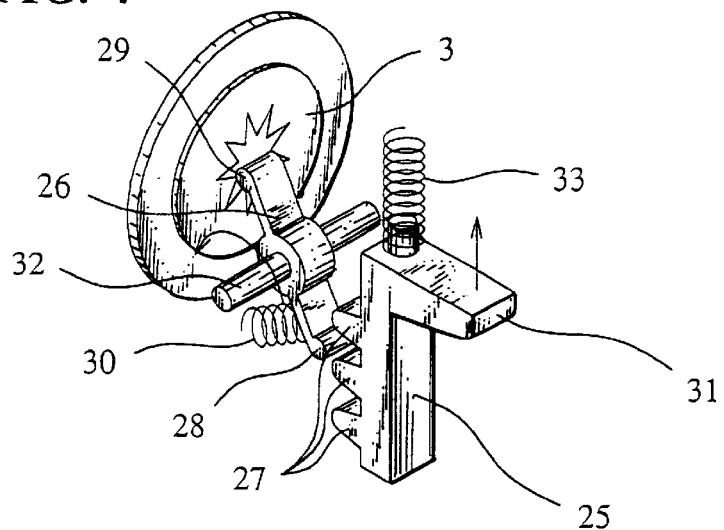
FIG. 4 is a perspective view showing a modification of a beating mechanism.

Alternatively, the beating mechanism may be configured in such a manner as shown in FIG. 4. More particularly, a beating mechanism shown in FIG. 4 includes a slider 25 arranged so as to vertically slide and a seesaw member 26 arranged so as to pivotally move back and forth. The slider 25 is formed on a front surface thereof with a plurality of projections 27 so as to be spaced from each other at predetermined intervals in a longitudinal direction thereof. The seesaw member 26 is formed on one end thereof with a projection 28 adapted to be engaged with the projections 27 of the slider 25 and on the other end thereof with a beating projection 29 adapted to beat the piezoelectric element 3. The seesaw member 26 is urged by a spring 30 so as to permit the beating projection 29 to beat the piezoelectric element 3. The slider 25 is provided on a rear surface thereof with an operation rod 31 in a manner to outwardly project therefrom. Thus, when the operation rod 31 is upwardly forcibly moved, the projections 27 of the slider 25 are engaged with the projection 28 of the seesaw member 26 in order, to thereby pivotally move the seesaw member 26 about a support shaft 32 in a clockwise direction. When the projection 28 of the seesaw member 26 is released from engagement with the projections 27 of the slider 25, the spring 30 urges the seesaw member 26 so as to permit the seesaw member 26 to be forcibly pivotally moved in a counterclockwise direction, resulting in the beating section 29 beating the piezoelectric element 3. In FIG. 4, reference numeral 33 designates a spring for forcibly downwardly moving the upwardly moved slider 25 to the original position.

Figure 5A:
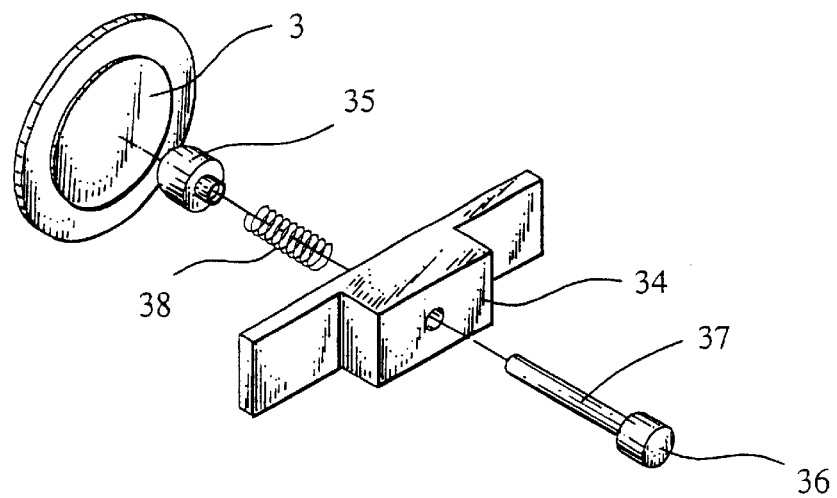
FIG. 5A is a perspective view showing another modification of a beating mechanism.
Figure 5B:
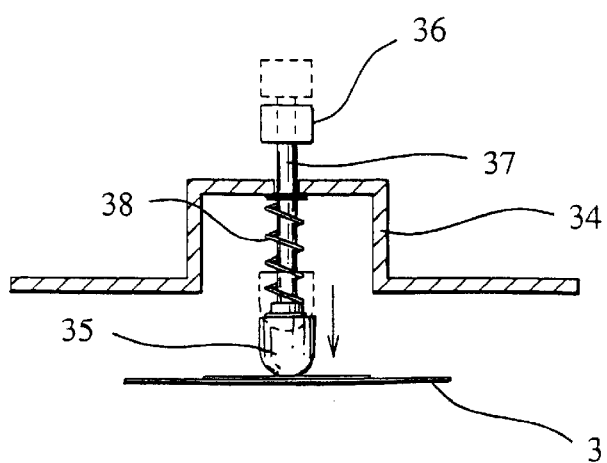
FIG. 5B is a sectional view of the beating mechanism shown in FIG. 5A.

Further, the beating mechanism A may be constructed as shown in FIGS. 5A and 5B. More particularly, a beating mechanism shown in FIGS. 5A and 5B includes a shaft 37 arranged in a support 34 so as to be movable back and forth. The shaft 37 is provided at a front end thereof with a beating section 35 and at a rear end thereof with a grip 36. The beating mechanism also includes a spring 38 for biasing the beating section 35 so as to permit it to beat the piezoelectric element 3. When the grip 36 is manually pulled against the spring 38 and then released from a hand, the beating section 35 biased by the spring 38 is permitted to vigorously beat a central portion of the piezoelectric element 3, so that the piezoelectric element 3 may be strained.

Figure 6:
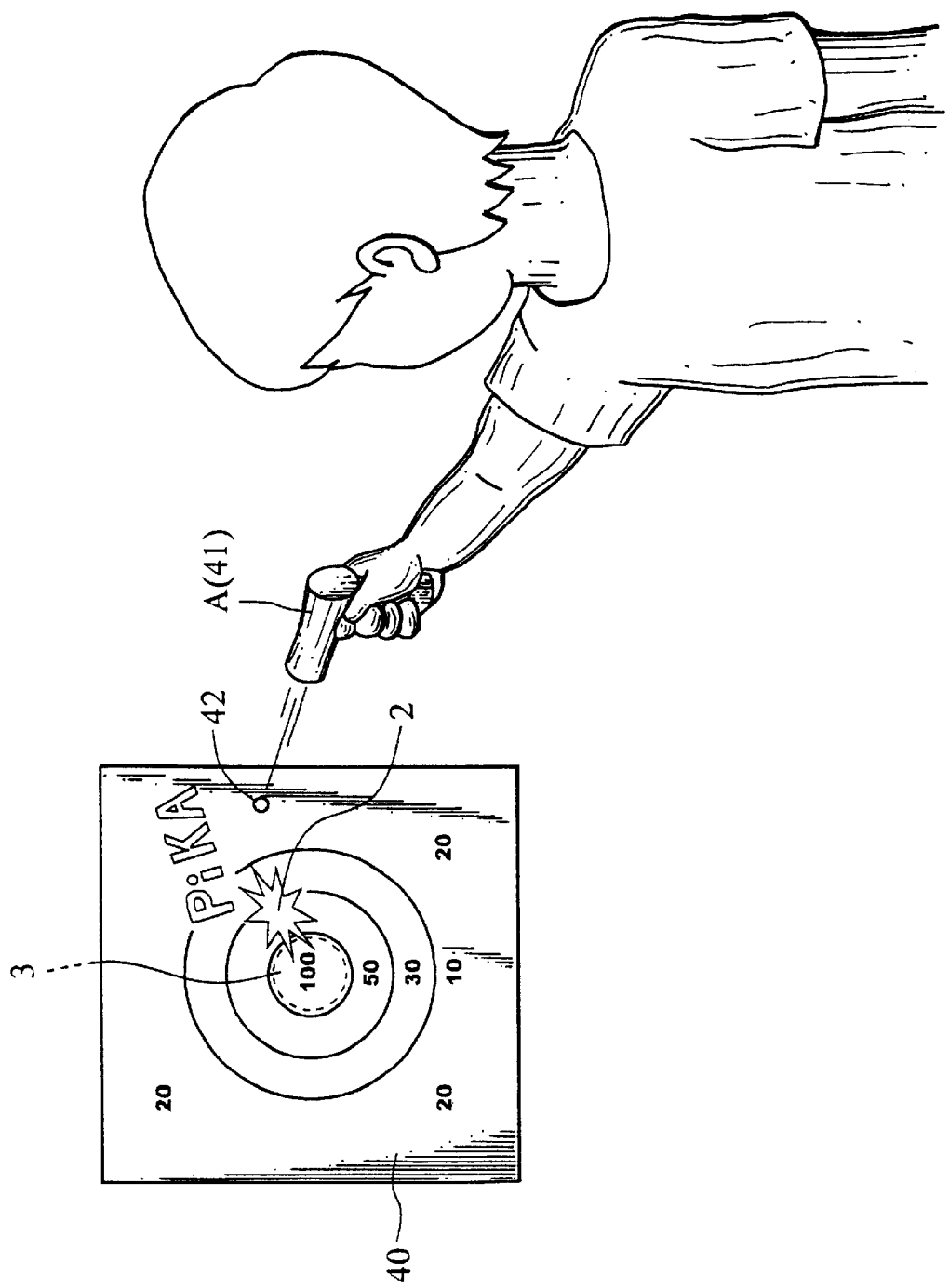
FIG. 6 is a perspective view showing another embodiment of a luminous toy according to the present invention, which is practiced in the form of a target toy.

Referring now to FIG. 6, another embodiment of a luminous toy according to the present invention is illustrated. A luminous toy of the illustrated embodiment includes a toy body constituted by a target toy member 40 and a strain generating means A constituted by a shooting unit 41 formed in imitation of a pistol. The target toy member 40 has a piezoelectric element 3 embedded in a central portion thereof. Thus, when a projectile or bullet 42 shot from the shooting unit 41 hits the target right in the center, the piezoelectric element 3 is strained to generate a voltage, resulting in the LEDs 2 emitting light.

Thus, the luminous toy of the illustrated embodiment permits target play to be carried out at any time anywhere without requiring any specific electric power source such as a battery whenever the play is desired.

Figure 7A:
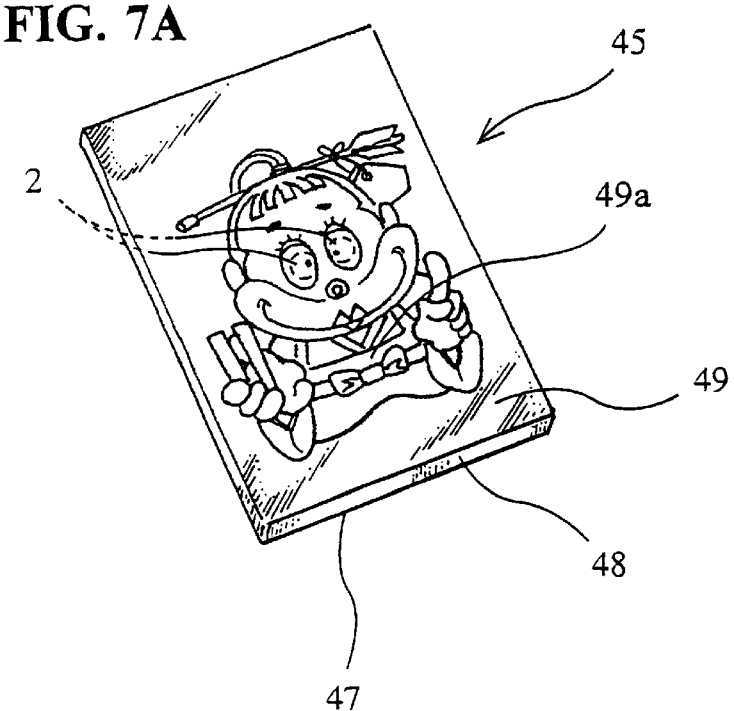
FIG. 7A is a perspective view showing a further embodiment of a luminous toy according to the present invention, which is in the form of a card toy.
Figure 7B:
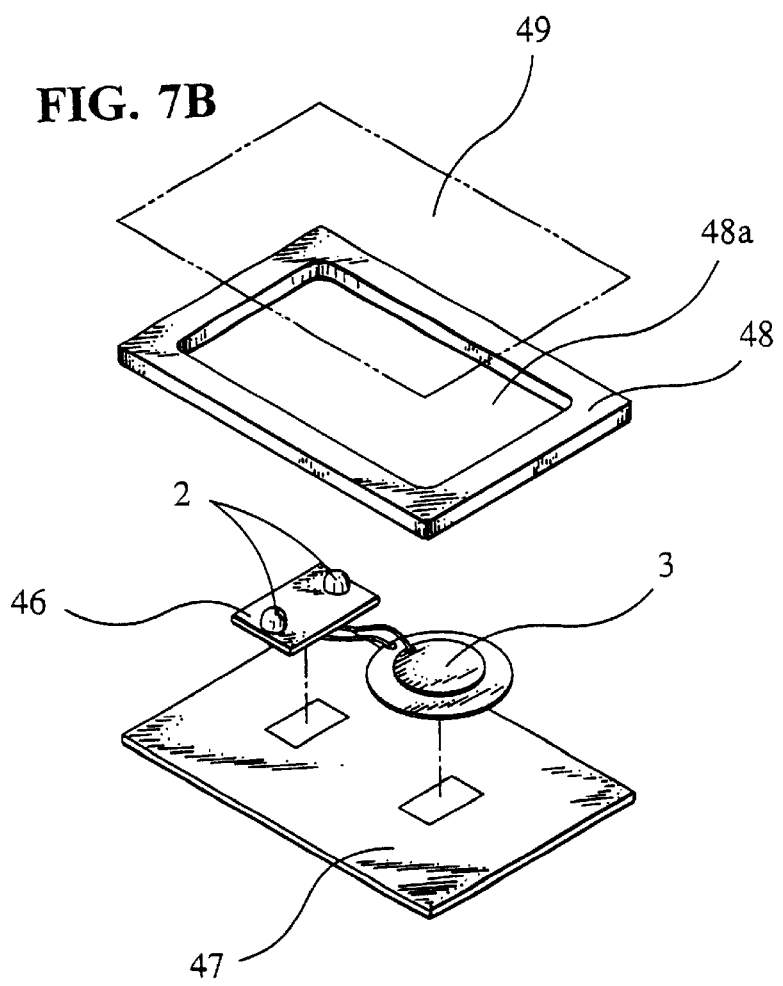
FIG. 7B is an exploded perspective view of the luminous toy shown in FIG. 7A.

Referring now to FIGS. 7A and 7B, a further embodiment of a luminous toy according to the present invention is illustrated. A luminous toy of the illustrated embodiment includes a toy body constituted by a card 45. The card 45 includes a substrate 47 acting as a strain generating means A, a frame 48 having an opening 48a formed at a central portion thereof and stuck on the substrate 47, and a sheet 49 having a pattern 49a such as a character or the like displayed on a front surface thereof and stuck on the frame 48 so as to cover an upper surface thereof. The substrate 47 has a piezoelectric element 3 and a printed board 46 stuck thereon. The printed board 46 has LEDs 2, a rectifying circuit and a capacitor arranged thereon. When the luminous toy of the illustrated embodiment thus constructed is slapped down on the ground or the like as in a menko (a card used in a Japanese children's game), the substrate 47 is strained, to thereby strain the piezoelectric element 3. This results in a voltage being induced across the piezoelectric element 3, leading to luminescence of the LEDs 2. In this instance, location of the LEDs 2 at positions corresponding to eyes of a character displayed on the sheet 49 permits the eyes of the character to emit light the moment the card is slapped down on the ground. Thus, it will be noted that the illustrated embodiment realizes a thin card which is capable of emitting light while eliminating a necessity of arranging any specific power source such as a battery.

Figure 8A:
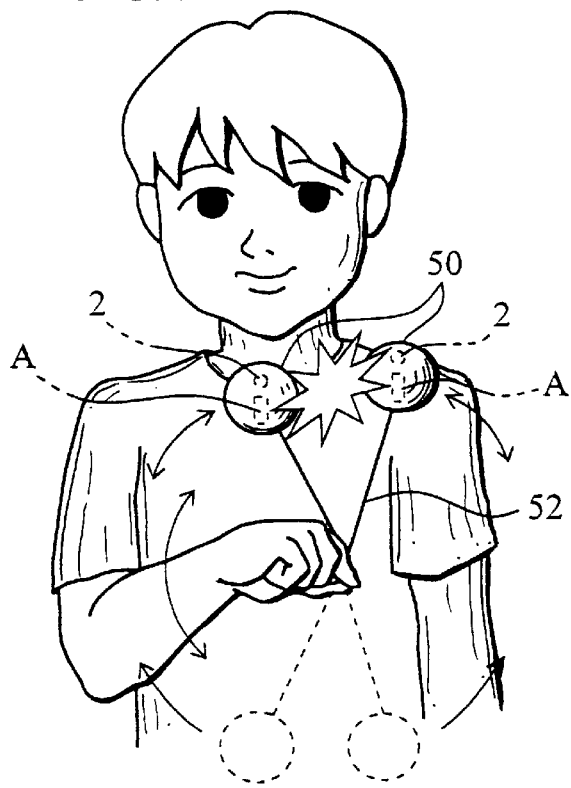
FIG. 8A is a perspective view showing still another embodiment of a luminous toy according to the present invention, in which a toy body is constituted by a spherical body.
Figure 8B:
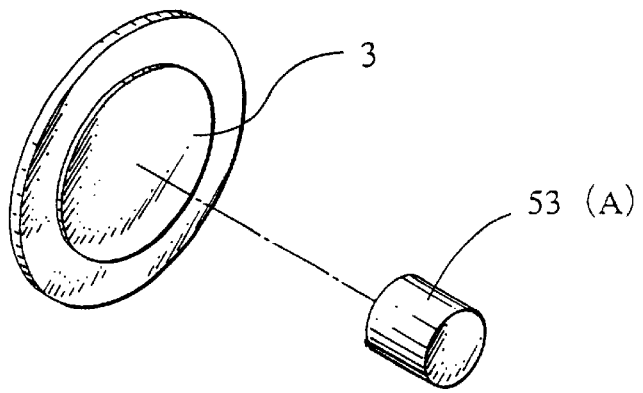
FIGS. 8B and 8C are an exploded perspective view and a perspective view showing a weight member serving as a strain generating means incorporated in the luminous toy of FIG. 8A, respectively.
Figure 8C:
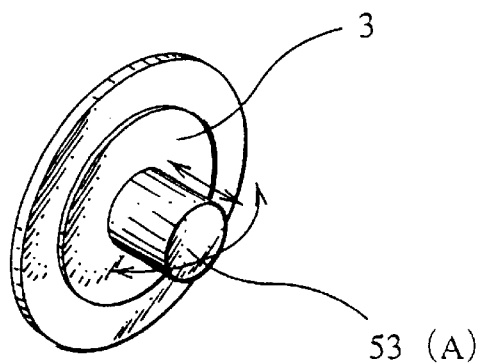

Referring now to FIGS. 8A to 8C, still another embodiment of a luminous toy according to the present invention is illustrated. A luminous toy of the illustrated embodiment includes a toy body constituted by a spherical body 50. The spherical body 50 is made of a translucent or transparent resin material and formed to have a hollow configuration. The spherical body 50 is provided therein with an LED 2, a piezoelectric element, a rectifying circuit, a capacitor and a strain generating means A. The strain generating means A, as shown in FIGS. 8B and 8C, is constituted by a weight member 53 fixed on a central portion of the piezoelectric element 3. In the illustrated embodiment, two such spherical bodies 50 are connected together through a single string 52. Thus, the luminous toy of the illustrated embodiment is operated in such a manner that the string 52 is taken at a central portion thereof between fingers of a user or player to hit the spherical bodies 50 on each other. Hitting between the spherical bodies 50 permits acceleration and inertia of each of the weight members 53 to be generated in all directions, leading to straining of the piezoelectric element 3. This results in the piezoelectric element 3 inducing a voltage thereacross, leading to luminescence of the LED 2.

Thus, the luminous toy of the illustrated embodiment permits a user or player to enjoy not only collisional motion of the spherical bodies 50 and generation of impact sound due to the collision but luminescence of the LEDs 2 carried out during the collision.

Figure 9:
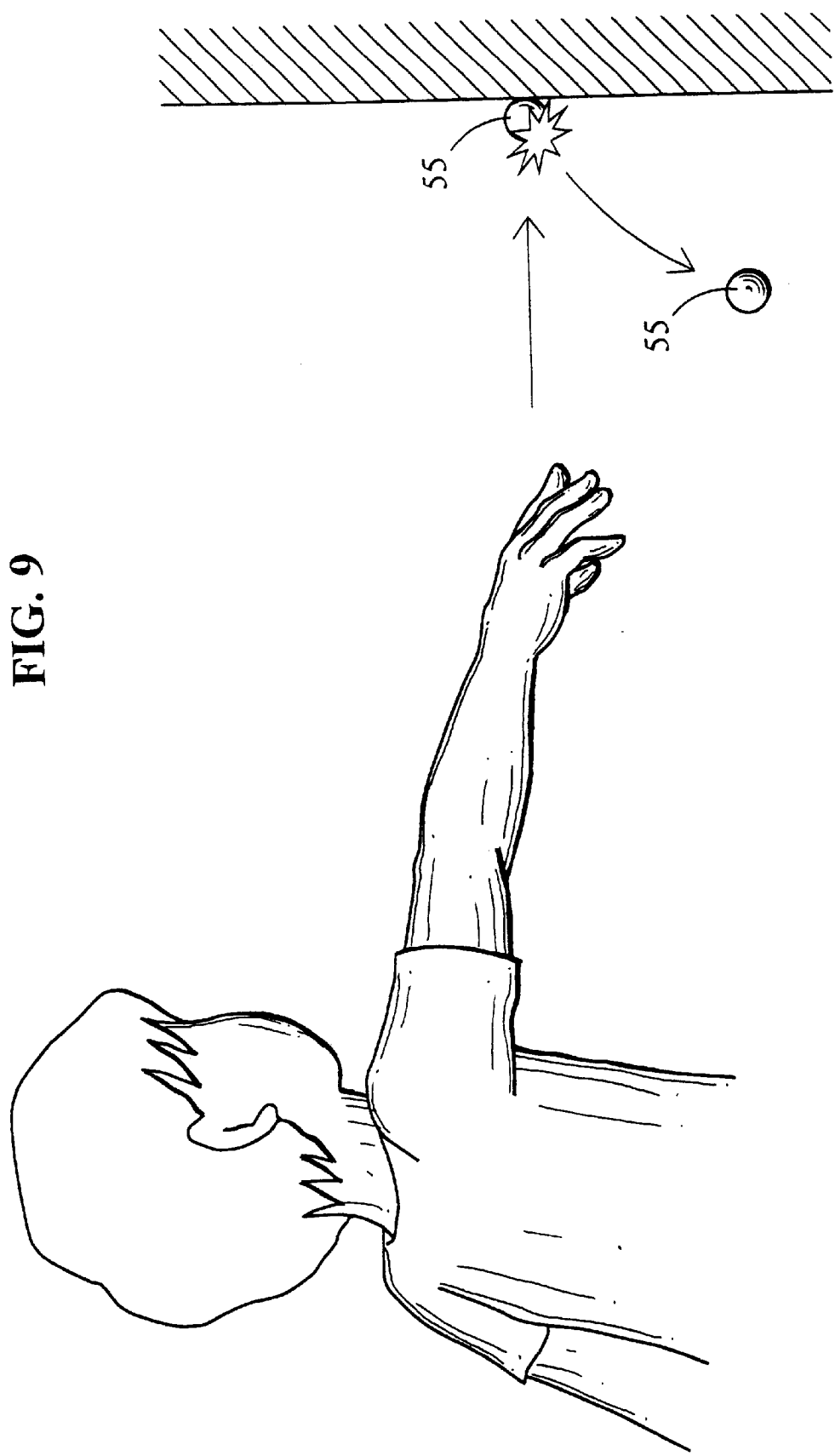
FIG. 9 is a perspective view showing a modification of the luminous toy of FIG. 8A.

In the illustrated embodiment, the spherical body may be made of a transparent or translucent resin material, so that the luminous toy may constitute a ball 55 which is operated or played in a manner to be thrown against a wall or the ground, as shown in FIG. 9. In this instance, the ball 55 may be provided therein with a strain generating means constituted by a weight member as in the spherical body 50 described above. In the ball 55 thus constructed, impact due to collision of the ball 55 with a wall or the ground permits the weight member to strain the piezoelectric element, resulting in the piezoelectric element inducing a voltage thereacross, leading to luminescence of the LED.

Such construction of the ball 55 permits the ball 55 to instantaneously emit light when it is struck against a wall or the ground, so that a user may enjoy ball play which is never provided by the prior art.

Figure 10A:
FIG. 10A is a perspective view showing yet another embodiment of a luminous toy according to the present invention.
Figure 10B:
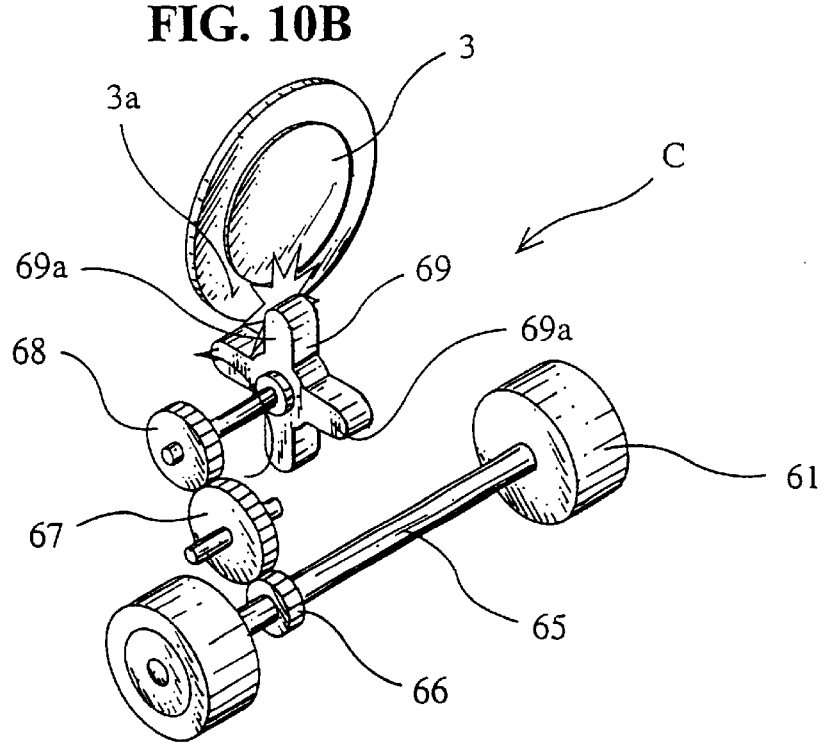
FIG. 10B is a perspective view showing a flip mechanism incorporated in the luminous toy shown in FIG. 10A.

Referring now to FIGS. 10A and 10B, a still further embodiment of a luminous toy according to the present invention is illustrated. A luminous toy of the illustrated embodiment includes a toy body constituted by a traveling body 60 rotatably mounted thereon with a pair of turning wheels 61. Thus, the traveling body 60 is configured in the form of a two-wheeled vehicle. The luminous toy also includes a flip mechanism C actuated in association with rotation of the turning wheels 61 to flip a piezoelectric element 3.

The traveling body 60 is constructed so as to advance when a user or player walks while gripping a handle 62. The traveling body 60 is formed on an upper surface thereof with a FIG. 63 indicating an animal or the like and a translucent dome-like display section 64. The display section 64 is provided therein with a plurality of LEDs 2. The above-described piezoelectric element 3 and flip mechanism C acting as a strain generating means are arranged in the traveling body 60. The flip mechanism C is constituted by a cross-shaped vane wheel 69 rotated through gears 66, 67 and 68 in association with rotation of an axle 65 on which the turning wheels 61 are mounted. The vane wheel 69 includes four vanes each having a distal end 69a, so that rotation of the vane wheel 69 permits the distal ends 69a to flip an end 3a of the piezoelectric element 3 in order.

Thus, in the luminous toy of the illustrated embodiment including the traveling body 60, traveling of the traveling body 60 permits the vane wheel 69 to flip the piezoelectric element 3, to thereby strain the piezoelectric element 3, so that the display section 64 may be flickered every time the distal ends 69a of the vane wheel 69 each flip the piezoelectric element 3. This permits a user to play with the luminous toy without paying attention to exhaustion of a power source, replacement thereof and the like which are encountered in the prior art.

Figure 11A:
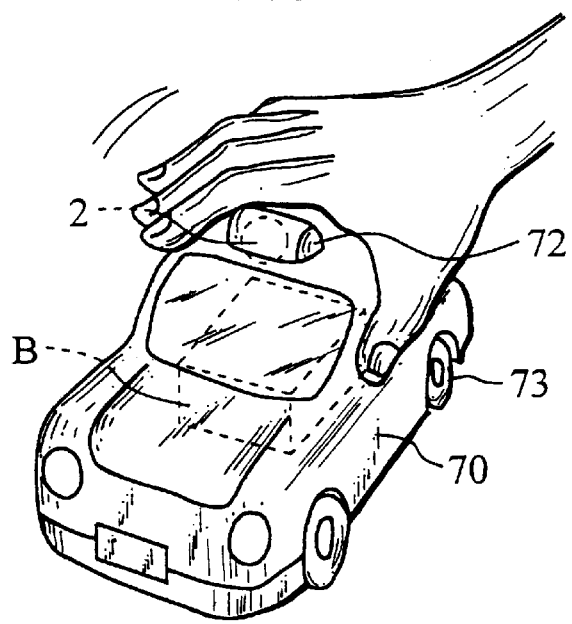
FIG. 11A is a perspective view showing a still further embodiment of a luminous toy according to the present invention, in which a toy body is constituted by a traveling body.
Figure 11B:
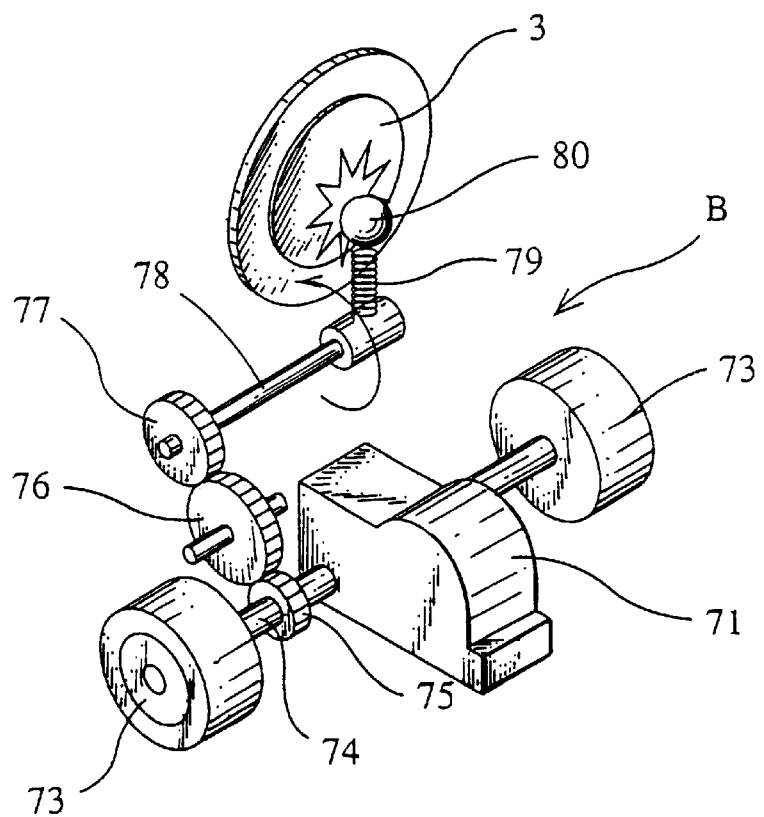
FIG. 11B is a perspective view showing a beating mechanism incorporated in the luminous toy of FIG. 11A.

Referring now to FIGS. 11A and 11B, a yet further embodiment of a luminous toy according to the present invention is illustrated. A luminous toy of the illustrated embodiment includes a toy body constituted by a traveling body 70 provided thereon with drive wheels 73. The traveling body 70 includes a spiral spring unit 71 constructed in a manner conventionally known in the art. Thus, the spiral spring unit 71 includes a spiral spring which is wound up when the traveling body 70 is moved back. The traveling body 70 is configured in the form of a squad car or an ambulance car and provided on an upper portion thereof with a display section 72 formed in imitation of a red light. The display section 72 is provided therein with a plurality of LEDs 2. The drive wheels 73 are rotated by unwinding force of the wound-up spring, so that the traveling body 70 may be advanced and a beating mechanism B may be actuated. The beating mechanism B includes gears 76 and 77 operatively associated with a gear 75 mounted on a drive shaft 74 on which the drive wheels 73 are mounted, a revolving shaft 78 and a weight member 80 mounted on the revolving shaft 78 through a spring 79. Thus, turning of the revolving shaft 78 permits the weight member 80 to beat a central portion of a piezoelectric element 3.

The luminous toy of the illustrated embodiment eliminates a necessity of providing a space for receiving a battery for a power source and a lid member required for replacing the battery.

Also, the luminous body permits the toy body or traveling body 70 to travel by unwinding force of the wound-up spiral spring and the weight member 80 mounted through the spring 79 on the revolving shaft 78 rotated in association with the drive wheels 73 to beat the piezoelectric element 3, leading to luminescence of the LEDs 2. Thus, the illustrated embodiment realizes a luminous toy which not only travels but exhibits an added value of permitting luminescence of the display section.

As can be seen from the foregoing, the luminous toy of the present invention is so constructed that the strain generating means strains the piezoelectric element to induce an AC voltage across the piezoelectric element, which is then converted into a DC voltage by means of the rectifying circuit and capacitor. The thus-converted DC voltage leads to luminescence of the luminous element. Such construction of the present invention leads to realization of a luminous toy which does not require a battery acting as a power source, to thereby prevent environmental pollution.

In the present invention, the strain generating means may be selected from the beating mechanism for beating the piezoelectric element and the flip mechanism for flipping the piezoelectric element. Actuation of the beating mechanism or flip mechanism leads to straining of the piezoelectric element, to thereby permit it to generate a voltage, resulting in the luminous element emitting light.

In the present invention, the beating mechanism or flip mechanism may be constructed so as to repeatedly strain the piezoelectric element. This permits the voltage to be repeatedly induced across the piezoelectric element, resulting in the luminous element being repeatedly flickered.

Also, in the present invention, the toy body may be constituted by the target toy and the strain generating means may be constituted by the shooting unit for shooting the projectile at the target toy. Thus, a user or player may enjoy the target toy, because hitting of the projectile on the target toy leads to luminescence of the luminous element.

Further, the present invention may be so constructed that the toy body is constituted by the card body including the substrate and the strain generating means is constituted by the substrate of the card body, wherein the substrate has the piezoelectric element fixed thereon. Straining of the card body permits the display on the card to emit light, so that a user may enjoy unique card play which is never provided by the prior art.

In the present invention, the toy body may be constituted by the spherical body and the strain generating means may be constituted by the weight member, wherein the weight member may be fixed to the piezoelectric element. Such construction permits a user to enjoy ball play which is never obtained by the prior art. Also, the luminous element and the circuit for exciting the luminous element received in the spherical body are out of sight, therefore, the luminous toy exhibits curious attraction.

Moreover, the present invention may be so constructed that the toy body is constituted by the traveling body including the turning wheels and the beating mechanism or flip mechanism is operated in association with the turning wheels. Thus, mere traveling of the traveling body permits luminescence of the luminous element, so that the luminous toy may exhibit an added value of permitting luminescence of the display section while traveling.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A luminous toy comprising:

a toy body provided with a piezoelectric element which induces a voltage when it is strained, a rectifying circuit for rectifying the voltage generated from said piezoelectric element, a capacitor for smoothing the voltage rectified by said rectifying circuit and a luminous element connected in parallel to said capacitor; and a strain generating means for generating strain for straining said piezoelectric element wherein said generating means is arranged in the toy body and includes a movable engageable element adjacent to the piezoelectric element, said engageable element being moved to engage with the piezoelectric element to thereby strain the piezoelectric element.

2. A luminous toy as defined in claim 1, wherein said strain generating means is selected from a beating mechanism for beating said piezoelectric element and a flip mechanism for flipping said piezoelectric element.

3. A luminous toy as defined in claim 2, wherein said toy body is constituted by a traveling body including turning wheels; and said beating mechanism or flip mechanism is operated in association with said turning wheels.

4. A luminous toy as defined in claim 2, wherein said beating mechanism or flip mechanism repeatedly strains said piezoelectric element.

5. Luminous toy as defined in claim 4, wherein said toy body is constituted by a traveling body including turning wheels; and said beating mechanism or flip mechanism is operated in association with said turning wheels.

6. A luminous toy as defined in claim 1, wherein said toy body is constituted by a traveling body including turning wheels; and said beating mechanism or flip mechanism is operated in association with said turning wheels.

7. A luminous toy comprising:

a toy body provided with a piezoelectric element which induces a voltage when it is strained, a rectifying circuit for rectifying the voltage generated from said piezoelectric element, a capacitor for smoothing the voltage rectified by said rectifying circuit and a luminous element connected in parallel to said capacitor; and a strain generating means for generating strain for straining said piezoelectric element;

wherein said toy body is constituted by a traveling body including turning wheels; and said beating mechanism or flip mechanism is operated in association with said turning wheels.

8. Luminous toy as defined in claim 7, wherein said strain generating means is selected from a beating mechanism for beating said piezoelectric element and a flip mechanism for flipping said piezoelectric element.

9. Luminous toy as defined in claim 8, wherein said beating mechanism or flip mechanism repeatedly strains said piezoelectric element.

* * * * *